United States Patent
Sato et al.

(10) Patent No.: US 9,606,536 B2
(45) Date of Patent: Mar. 28, 2017

(54) VEHICLE CONTROL DEVICE

(71) Applicant: TOYOTA JIDOSHA KABUSHIKI KAISHA, Toyota-shi, Aichi (JP)

(72) Inventors: Jun Sato, Susono (JP); Masahiro Iwasaki, Numazu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/791,579

(22) Filed: Jul. 6, 2015

(65) Prior Publication Data

US 2016/0041553 A1 Feb. 11, 2016

(30) Foreign Application Priority Data

Aug. 8, 2014 (JP) .................... 2014-162277

(51) Int. Cl.
| | |
|---|---|
| *G05D 1/00* | (2006.01) |
| *B60W 50/00* | (2006.01) |
| *B60W 50/14* | (2012.01) |
| *B60W 50/08* | (2012.01) |
| *B60K 28/06* | (2006.01) |

(52) U.S. Cl.
CPC ......... *G05D 1/0061* (2013.01); *B60K 28/066* (2013.01); *B60W 50/0098* (2013.01); *B60W 50/082* (2013.01); *B60W 50/14* (2013.01); *G05D 1/0088* (2013.01); *B60W 2540/26* (2013.01); *B60W 2600/00* (2013.01)

(58) Field of Classification Search
CPC ............ B60K 28/066; B60W 2540/26; B60W 2600/00; B60W 50/0098; B60W 50/82; B60W 50/14; G05D 1/0061; G05D 1/0088

USPC .................................................... 701/23, 93
See application file for complete search history.

(56) References Cited

U.S. PATENT DOCUMENTS

| | | | |
|---|---|---|---|
| 5,774,069 A | 6/1998 | Tanaka et al. | |
| 5,906,645 A * | 5/1999 | Kagawa | B60T 7/12 180/167 |
| 8,818,608 B2 * | 8/2014 | Cullinane | B60W 30/00 701/117 |
| 8,825,258 B2 * | 9/2014 | Cullinane | B60W 30/00 701/117 |
| 9,025,140 B2 * | 5/2015 | Zhu | G01S 17/95 356/3.01 |
| 9,207,323 B2 * | 12/2015 | Zhu | G01S 17/023 |
| 2003/0088344 A1 * | 5/2003 | Oda | G05D 1/027 701/23 |

(Continued)

FOREIGN PATENT DOCUMENTS

| | | |
|---|---|---|
| DE | 102012112802 A1 | 6/2014 |
| EP | 2848488 A1 | 3/2015 |

(Continued)

*Primary Examiner* — Tyler J Lee
(74) *Attorney, Agent, or Firm* — Sugrue Mion, PLLC

(57) ABSTRACT

In a vehicle control device that is configured to be capable of switching from an automatic travel of the vehicle to manual travel by a driver, a manual driving adaptation degree of a driver during an automatic travel is calculated based on a driver state (S16), a notification timing is set such that the notification timing is earlier as the manual driving adaptation degree becomes lower (S18), and the automatic travel end notification is given to the driver at the set notification timing (S20).

6 Claims, 4 Drawing Sheets

(56) References Cited

U.S. PATENT DOCUMENTS

| | | | | |
|---|---|---|---|---|
| 2014/0222277 A1* | 8/2014 | Tsimhoni | ............. | B60W 30/00 |
| | | | | 701/23 |
| 2015/0142244 A1* | 5/2015 | You | ..................... | G05D 1/0061 |
| | | | | 701/23 |
| 2015/0210272 A1* | 7/2015 | Edgren | ................... | G08B 6/00 |
| | | | | 701/23 |

FOREIGN PATENT DOCUMENTS

| | | | |
|---|---|---|---|
| JP | 9161196 | A | 6/1997 |
| JP | 2002-236993 | A | 8/2002 |
| JP | 2002-329300 | A | 11/2002 |
| JP | 2007196809 | A | 8/2007 |

\* cited by examiner

VEHICLE CONTROL DEVICE

BACKGROUND OF THE INVENTION

Field of the Invention

The present invention relates to a vehicle control device.

Related Background Art

As a device relating to a vehicle control, for example, as disclosed in Japanese Unexamined Patent Application Publication No. 9-161196, a device that enables the vehicle to autonomously travel and performs control processing in which the autonomous travel of the vehicle is switched to manual travel by a driver is known.

The device performs an operation of urging the driver to switch the travel mode to the manual travel when the vehicle approaches a point where the travel mode is scheduled to be switched to the manual travel.

SUMMARY

In the device described above, there is a problem in that it is not possible to appropriately urge the driver to switch the travel mode from the autonomous travel to the manual travel by the driver. For example, in the autonomous travel, there are two cases according to a wakefulness state: one is a case where the driver can soon switch the travel mode to the manual travel and the other is a case where the driver cannot switch the travel mode. In both of these cases, it is not always appropriate that notification timings to urge the driver to switch the travel mode to the manual travel be the same.

Therefore, in the present technical field, it is desirable to develop a vehicle control device that can appropriately perform a notification of switching from automatic travel of a vehicle to manual travel according to the state of the driver.

That is, a vehicle control device according to an aspect of the present invention is configured to be capable of switching from an automatic travel of the vehicle to manual travel by a driver. The device includes: a driver state detection unit that is configured to detect a driver state of the driver of the vehicle; a calculation unit that is configured to calculate a manual driving adaptation degree of the driver during the automatic travel of the vehicle based on the driver state detected by the driver state detection unit; and a notification unit that is configured to perform an automatic travel end notification to the driver before the vehicle arrives at the automatic travel ending point set in advance. The notification unit performs the automatic travel end notification at an earlier timing as the manual driving adaptation degree becomes lower.

According to the vehicle control device, by performing the automatic travel end notification at an earlier timing as the manual driving adaptation degree of the driver becomes lower, a time it takes for the vehicle to arrive at the automatic travel ending point from the time of automatic travel end notification can be made long as manual driving adaptation degree is lower. In this way, it is possible to appropriately notify the driver of the switching from the automatic driving of the vehicle to the manual travel by the driver.

In addition, in the vehicle control device may further include: a driving operation detector that is configured to detect a driving operation state of the driver; a driving operation state determination unit that is configured to determine whether or not the driver is in a manual driving acceptance state based on the driving operation state detected by the driving operation detector after the automatic travel end notification is performed by the notification unit; and a vehicle travel control unit that is configured to change the travel state of the vehicle in a case where it is determined by the driving operation state determination unit that the driver is not in the manual driving acceptance state. In this case, by changing the travel state of the vehicle in a case where the driver is not in the manual driving acceptance state after performing the automatic travel end notification, it is possible to suppress the switching to the manual travel by the driver in the inappropriate state.

In addition, in the vehicle control device described above, in a case where it is determined that the driver is not in the manual driving acceptance state by the driving operation state determination unit, the vehicle travel control unit may decrease the vehicle speed. In this case, by decreasing the vehicle speed in a case where the driver is not in the manual driving acceptance state after performing the automatic travel end notification, the time it takes for the vehicle to arrive at the automatic travel ending point can be extended, and thus, it is possible to make it easy to switch to the manual travel by the driver.

In addition, in the vehicle control device described above, in a case where it is determined that the driver is not in the manual driving acceptance state by the driving operation state determination unit, the vehicle travel control unit may stop the vehicle. In this case, by stopping the vehicle in a case where the driver is not in the manual driving acceptance state after performing the automatic travel end notification, it is possible to suppress the switching to the manual travel by the driver in an inappropriate state.

In addition, in the vehicle control device described above, the calculation unit may calculate a wakefulness degree of the driver as the manual driving adaptation degree, and the notification unit may perform the automatic travel end notification at the earlier timing as the wakefulness degree of the driver becomes lower. In this case, by notifying the ending of the automatic travel at the timing corresponding to the wakefulness degree of the driver, it is possible to notify of the ending of the automatic travel at the timing conforming to the wakefulness state of the driver.

Furthermore, in the vehicle control device described above may further include a storage unit that is configured to store data in which the manual driving adaptation degree at the time when the automatic travel end notification is performed and a time it takes from the automatic travel end notification to the time when the driver is in the manual driving adaptation state in the above manual driving adaptation degree are associated with each other. The notification unit may perform the automatic travel end notification at the timing set based on the manual driving adaptation degree calculated by the calculation unit and the data stored in the storage unit. In this case, by setting the timing for the automatic travel end notification based on the storage data in which the manual driving adaptation degree of the driver and the time it takes to the time when the driver is in the manual driving adaptation state are associated with each other, the notification of switching from the automatic travel of the vehicle to the to the manual travel by the driver can be appropriately performed according to the characteristics of the driver.

According to the present invention, it is possible to provide a vehicle control device that can appropriately perform a notification of switching from an automatic travel to manual travel according to a state of the driver.

DESCRIPTION OF THE PREFERRED EMBODIMENTS

Hereinafter, an embodiment of the present invention will be described with reference to the drawings. In the description below, the same reference signs will be given to the same or corresponding elements and the description thereof will not be repeated.

Figure 1:
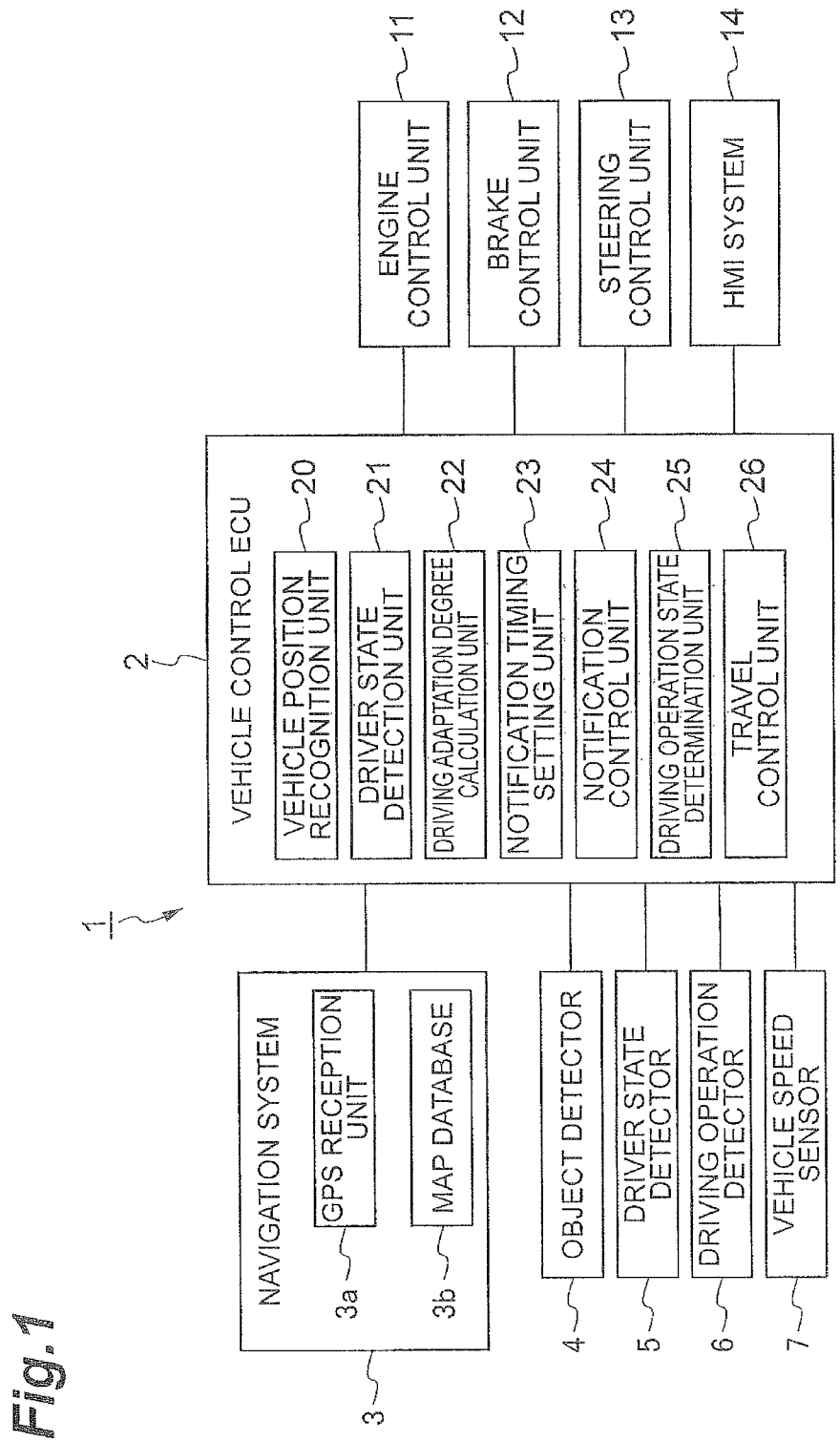
FIG. 1 is a block diagram illustrating an overall configuration of a vehicle control device in an embodiment of the present invention.
Figure 2:
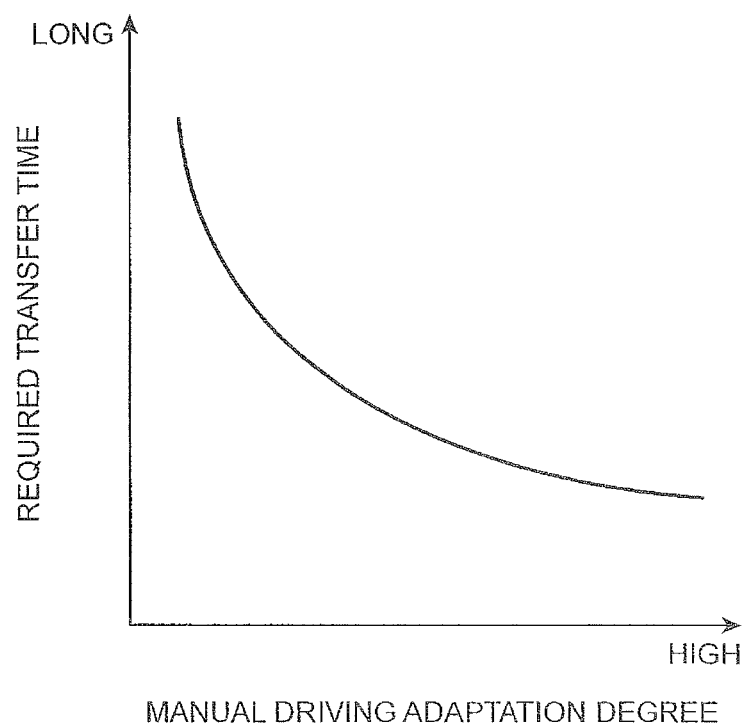
FIG. 2 is a diagram explaining a calculation map of a required transfer time in the vehicle control device in FIG. 1.

FIG. 1 is a diagram illustrating an overall configuration of a vehicle control device 1 in an embodiment of the present invention. FIG. 2 is an explanatory diagram of an object detection operation in the vehicle control device 1.

As illustrated in FIG. 1, the vehicle control device 1 in the embodiment of the present invention is a device mounted on a vehicle, causes the vehicle to automatically travel, and enables an automatic travel of the vehicle by the automatic driving to be switched to the manual travel by the driver. For example, the vehicle control device 1 can cause the vehicle to automatically travel by an automatic driving of the vehicle by performing an automatic travel control. In addition, the vehicle control device 1 enables the automatic travel by the automatic driving to be switched to the manual travel by the driver. Here, the automatic travel means that the vehicle automatically travels along the travel path and includes an autonomous travel by the travel control by the vehicle control device 1 and the travel by the automatic driving. For example, causing the vehicle to automatically travel toward a destination preset without the driving operation of the driver is included in the automatic travel. In the automatic travel, it is not necessary that all the control of the vehicle is automatically performed, but the travel in which the driver is not a main entity of the driving operation may be included in the automatic travel. Specifically, the travel by a cruise control or a lane trace control corresponds to the automatic travel. The manual travel means a travel of the vehicle in which the driver is a main entity of the driving operation and includes a travel by a manual driving or a travel in which a driving assist control is performed in an auxiliary manner on the basic manual driving. The vehicle control device 1 causes the vehicle to automatically travel by the automatic travel control, and enables the automatic travel to be switched to the manual travel by the manual travel of the driver by stopping or releasing the automatic travel control.

The vehicle control device 1 includes a vehicle control electronic control unit (ECU) 2. The vehicle control ECU 2 is an electronic control unit that performs a vehicle control, and is configured of a computer as a main body which includes a central processing unit (CPU), a read only memory (ROM), and a random access memory (RAM).

The vehicle control ECU 2 is connected to a navigation system 3, an object detector 4, a driver state detector 5, a driving operation detector 6, and a vehicle speed sensor 7. In addition, the vehicle control ECU 2 is connected to an engine control unit 11, a brake control unit 12, a steering control unit 13, and an HMI system 14.

The navigation system 3 is a route guidance system that performs guidance to a driver of the vehicle to the destination set by the driver. The navigation system 3, for example, includes a GPS reception unit 3a that is used for measuring position information of the vehicle and a map database 3b in which map information is stored. The GPS reception unit 3a, for example, measures the position information (for example, latitude and longitude) of the vehicle by receiving signals from three or more GPS satellites. For example, position information of the road, type information of the road, or shape information of the road is included in the map information in the map database.

The navigation system 3 recognizes a travelling road and a travelling lane on which the vehicle travels based on the position information of the vehicle measured by the GPS reception unit 3a and the map information in the map database. The navigation system 3 calculates a route from the position of the vehicle to the destination, and performs a guidance of the route to the driver by displaying the route on a display of the navigation and a voice output from a speaker in the vehicle. The navigation system 3, for example, transmits the position information of the vehicle, the travelling road (travelling lane) information of the vehicle, and the guidance route information of the vehicle to the vehicle control ECU 2.

The object detector 4 functions as a detection unit that detects an object around the vehicle. A device such as a laser radar, a millimeter-wave radar, an ultrasonic radar, and a camera are used as the object detector 4. In order to detect the object around the vehicle, a combination of these devices may be used or a part of the device may be used. As a camera, for example, a stereo camera may be used. In addition, this camera may be used for recognizing white lines on the travel path. The object detector 4 outputs the detection information to the vehicle control ECU 2.

The driver state detector 5 is sensor used for detecting the state of the driver driving the vehicle, and a camera imaging the driver are used as the driver state detector 5. In a case where the camera is used, the driver state detector 5 can detect the state of the driver as image information. Then, it is possible to detect the wakefulness state and the concentration state of the driver based on this image information. The camera may be mounted so as to image the driver from the front or a plurality of cameras may be used and images the driver from various angles.

In addition, a biological sensor may be used as the driver state detector 5. In this case, the driver state detector 5 can detect the state of the driver as heart beat information or brain wave information. The wakefulness state of the driver can be detected based on the heart beat information and the brain wave information. A wearable device can be used as the biological sensor, and for example, a ring shaped type mounted on a finger of the driver, a wrist band shaped type mounted on a shoulder of the driver, a head band shaped type mounted on the head of the driver, or a glasses type mounted on the head of the driver is used. The driver state detector 5 outputs the detection information to the vehicle control ECU 2.

The driving operation detector 6 is a detection unit that detects a driving operation state of the driver, and for example, a steering sensor, an accelerator pedal sensor, and a brake pedal sensor are used as the driving operation detector 6. The steering sensor detects a steering operation state or a steering operation readiness state of the driver, and for example, a steering torque sensor, a steering angle sensor, or a steering touch sensor are used as the steering sensor. The steering touch sensor is a sensor provided on a steering wheel and detects a contact or a grasping pressure of the driver with respect to the steering wheel. The accelerator pedal sensor is a sensor provided on, for example, a shaft portion of the accelerator pedal of the vehicle, and detects an amount of depression of the accelerator pedal (position of the accelerator pedal). The brake pedal sensor is a sensor provided on, for example, a brake pedal and detects an amount of depression of the brake pedal (position of the brake pedal). In addition, the brake pedal sensor may be a sensor that detects an operation force (a pressure to the brake pedal or a pressure of a master cylinder) of the brake pedal. The driving operation detector 6 outputs the detected signal to the vehicle control ECU 2.

The vehicle speed sensor 7 is sensor that detects a travel speed of the vehicle, that is, a vehicle speed, and for example, a vehicle wheel speed sensor is used as the vehicle speed sensor.

The engine control unit 11 is an electronic control unit that controls an engine of the vehicle. The engine control unit 11 controls the driving force of the vehicle by controlling, for example, an amount of fuel and an amount of air supplied to the engine. In a case where the vehicle is a hybrid vehicle or an electric vehicle, the engine control unit 11 functions as a motor control unit that performs the controlling of the motor which is driven as a power source. The engine control unit 11 controls the driving force of a vehicle M according to a control signal from the vehicle control ECU 2.

The brake control unit 12 is an electronic control unit that controls a brake system of the vehicle. For example, a hydraulic brake system can be used as the brake system. The brake control unit 12 controls a braking force given to the vehicle wheels by adjusting the hydraulic pressure given to the hydraulic brake system. The brake control unit 12 controls the braking force to the vehicle wheels according to the control signal from the vehicle control ECU 2. In a case where the vehicle includes a regenerative brake system, the brake control unit 12 may control both the hydraulic brake system and the regenerative brake system.

The steering control unit 13 is an electronic control unit that controls an electronic power steering system (EPS) of the vehicle. The steering control unit 13 controls a steering torque of the vehicle by driving an assist motor that controls the steering torque of the vehicle. The steering control unit 13 controls the steering torque according to the control signal from the vehicle control ECU 2.

The HMI system 14 is an interface used for outputting and inputting the information between the driver and the vehicle control device 1. The HMI system 14 includes a display used for outputting the image information, a speaker used for outputting the voice information, and an operation button or a touch panel used for the driver to perform the input operation. The HMI system 14 may recognize the voice input of the driver. The HMI system 14 outputs the signal according to the operation of the driver to the vehicle control ECU 2. The HMI system 14 outputs the information to the driver through the display or the speaker according to the control signal from the vehicle control ECU 2.

The HMI system 14 functions as a notification unit that performs an automatic travel end notification to the driver before the vehicle arrives at the automatic travel ending point set in advance. The HMI system 14 receives the notification control signal from the vehicle control ECU 2 and performs the notification operation, and performs the automatic travel end notification at an earlier timing as a manual driving adaptation degree becomes lower. In addition, the HMI system 14 may perform the automatic travel end notification at the timing set based on the manual driving adaptation degree of the driver and the past data in which the manual driving adaptation degree and the elapsed time from the automatic travel end notification to the time when the driver is in the manual driving adaptation state are associated with each other. The details of this timing will be described below.

The vehicle control ECU 2 includes a vehicle position recognition unit 20, a driver state detection unit 21, a driving adaptation degree calculation unit 22, a notification timing setting unit 23, a notification control unit 24, a driving operation state determination unit 25, and a travel control unit 26.

The vehicle position recognition unit 20 recognizes the position of the vehicle on the map. For example, the vehicle position recognition unit 20 recognizes the vehicle position on the map based on vehicle position data input from the navigation system 3, and determines whether or not the vehicle approaches the automatic travel control ending point within a predetermined distance. This determination is determination processing performed in a case where the vehicle travels by the automatic travel control, and is performed in order to determine whether the preparation of switching from the automatic travel to the manual travel is needed or not. A distance value set in the vehicle control ECU 2 in advance may be used as the predetermined distance. The travel control ending point is a point where the automatic travel control of the vehicle ends, and may be determined based on, for example, an area on which the travel control is performed or may be set by the input of the driver. In a case where the travel control ending point coincides with the destination of the vehicle, the processing relating to the notification of the switching from the automatic travel to the manual travel may not be performed.

The driver state detection unit 21 detects a state of the driver. For example, the driver state detection unit 21 detects at least one of the wakefulness state and the driving concentration state of the driver based on the detection information of the driver state detector 5. Specifically, the wakefulness state of the driver is detected based on the detection information of the heart beat information or the brain wave information of the driver. The wakefulness state of the driver may be detected as a wakefulness degree of the driver. In addition, a posture, a direction of the line of sight, and a looking ahead situation of the driver are detected based on the detection information of the image information in which the driver is imaged, and then, the driving concentration state or the driving readiness state of the driver is detected. The driving concentration state and the driving readiness state may be detected as a driving concentration degree of the driver. The driving concentration degree is a degree in which the driver can concentrate on the driving. For example, as the frequency or a time rate of gazing the front of the traveling direction is higher, the driving concentration degree is detected to be higher. Conversely, as the frequency or a time rate of inattentive driving of the driver is higher, the driving concentration is detected to be lower. In addition, in such a case where the driver operates a mobile terminal, the driving concentration degree is detected to be low.

The driving adaptation degree calculation unit 22 is a calculation unit that calculates the manual driving adaptation degree of the driver during the automatic travel based on the driver state detected by the driver state detection unit 21. For example, the driving adaptation degree calculation unit 22 calculates the manual driving adaptation degree based on the wakefulness degree or the driving concentration degree of the driver. Specifically, the calculation of the manual driving adaptation degree is performed using a calculation map in which the driver state and the manual driving adaptation degree are associated with each other. The manual driving adaptation degree is a degree of adaptation of the manual driving operation of the driver, and the value of the degree becomes high as the driver adapts to the manual driving. The manual driving adaptation degree is calculated to be higher as the wakefulness degree of the driver becomes higher and is calculated to be lower as the wakefulness degree of the driver becomes lower. In addition, the manual driving adaptation degree is calculated to be higher as the driving concentration degree of the driver becomes higher and is calculated to be lower as the driving concentration degree of the driver becomes lower. In addition, the wakefulness degree or the driving concentration degree of the driver may be directly used as the manual driving adaptation degree.

The notification timing setting unit 23 sets a timing for performing the automatic travel end notification to the driver before the vehicle arrives at the ending point of the automatic travel. That is, the notification timing setting unit 23 sets the timing of notifying the driver of the ending of the automatic travel before the vehicle switches from the automatic travel to the manual travel. The automatic travel end notification means a notification of the fact that the automatic travel control ends is given to the driver in advance. For an example of such a notification, a notification of the fact that the automatic travel control ends due to the vehicle entering the travel path on which the automatic travel control is not performed from the travel path on which the automatic travel control is performed is given to the driver in advance. The timing for performing the automatic travel end notification is set according to the manual driving adaptation degree. For example, the notification timing is set such that the timing becomes earlier as the manual driving adaptation degree becomes lower. In this way, in a case where the wakefulness degree is low or in a case where the manual driving cannot be ready, it is possible to make the transfer time to switch to the manual driving be long. Therefore, the switching from the automatic travel to the manual travel can smoothly be performed, and thus, it is possible to suppress the performing of inappropriate switching from the automatic travel to the manual travel. In addition, in a case where the wakefulness degree of the driver is used as the manual driving adaptation degree, the notification timing may be set such that the timing becomes earlier as the wakefulness degree becomes lower. In this case, the automatic travel end notification is performed at the earlier timing as the wakefulness degree of the driver becomes lower.

Specifically, as illustrated in FIG. 2, a required transfer time is calculated based on the manual driving adaptation degree using the calculation map in which the manual driving adaptation degree and the required transfer time are associated with each other. The required transfer time is a time required for the automatic travel transferring to the manual travel. In other words, the required transfer time is the time from the time when the automatic travel end notification is performed to the time when the driver is in the manual driving adaptation state. For this reason, the calculation map is a map in which the manual driving adaptation degree at the time of notification and the time from the time of automatic travel end notification in the manual driving adaptation degree to the time when the driver is in the manual driving adaptation state are associated with each other. The calculation map is stored in, for example, the notification timing setting unit 23. The manual driving adaptation state is a state in which the driver can adapt to the manual driving, and means the manual driving acceptance state. For this reason, the determination of whether or not it is the manual driving adaptation state may be performed by the same processing as the determination of whether or not it is the manual driving acceptance state.

The notification timing setting unit 23 functions as a storage unit in which the manual driving adaptation degree at the time of notification is stored in association with the time from the time of automatic travel end notification in the manual driving adaptation degree to the time when the driver is in the manual driving adaptation state, that is, the required transfer time. As illustrated in FIG. 2, the calculation map is set such that the required transfer time becomes shorter as the manual driving adaptation degree becomes higher. The calculation map may be set based on the past data of the manual driving adaptation degree and the required transfer time in the manual driving adaptation degree. For example, as the past data, the manual driving adaptation degree is stored in associated with the required transfer time in the manual driving adaptation degree, and then, the calculation map illustrated in FIG. 2 may be set based on the past data. In this case, it is possible to accurately estimate the required transfer time based on the manual driving adaptation degree, and thus, the automatic travel end notification can be performed in an appropriate timing. The calculation of the required transfer time is not limited to the calculation using the calculation map, but may be performed using a calculation table or a calculation equation. In addition, the manual driving adaptation degree may be calculated step-wise, the required transfer time is step-wisely calculated, and then, the notification timing may be set step-wise. For example, manual driving adaptation degree is determined in two states of good state and bad state, and the required transfer time and the notification timing may be set in two steps according to the above-described two states. In this case, it is possible to quickly set the notification timing.

Figure 3:
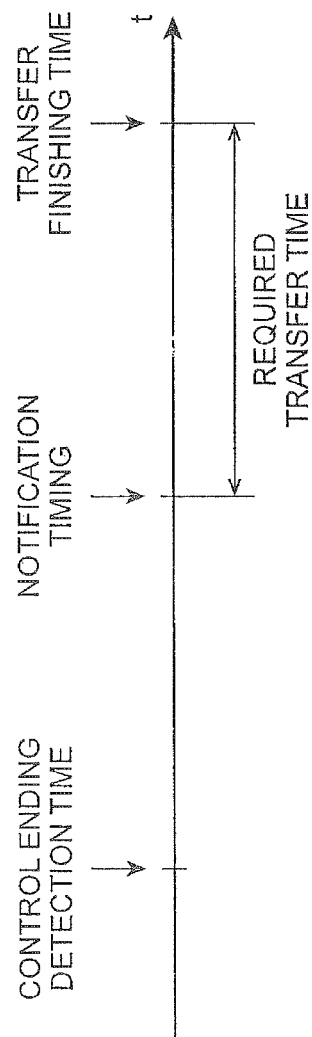
FIG. 3 is a diagram explaining a setting of notification timing in the vehicle control device in FIG. 1.

The notification timing setting unit 23 sets the notification timing using the required transfer time. For example, notification timing is set to be earlier as the required transfer time becomes long. In this way, the automatic travel end notification is performed at the notification timing corresponding to the manual driving adaptation degree. In setting a specific notification timing, as illustrated in FIG. 3, firstly, a transfer finishing time is calculated based on the distance to the automatic travel ending point and the vehicle speed, and then, a time or a time point which becomes the notification timing is set by subtracting the required transfer time from the transfer finishing time.

The setting of the notification timing is not limited to the case of using the required transfer time, but the notification timing may be set using a required transfer distance. For example, the required transfer distance may be set longer as the manual driving adaptation degree becomes lower, and then, the notification may be performed at a front point as much as the required transfer distance from the ending point of the automatic travel.

The notification control unit 24 outputs the notification control signal to the HMI system 14 which is a notification unit and performs the notification control. The notification control signal is output at the timing set by the notification timing setting unit 23.

The driving operation state determination unit 25 determines whether or not the driver is in the manual driving acceptance state. For example, the driving operation state determination unit 25 determines whether or not the driver is in the manual driving acceptance state based on the driving operation state detected by the driving operation detector 6 after the automatic travel end notification is performed by the HMI system 14. Specifically, in a case where a driver's contact to a steering wheel is detected by the driving operation detector 6, in a case where the accelerator pedal is detected to be pressed, or in a case where the brake pedal is detected to be pressed, it is determined that the driver is in the manual driving acceptance state. On the other hand, in a case where a driver's contact to a steering wheel is not detected by the driving operation detector 6, in a case where the accelerator pedal is not detected to be pressed, or in a case where the brake pedal is not detected to be pressed, it is determined that the driver is not in the manual driving acceptance state.

The travel control unit 26 is a vehicle travel control unit that performs the automatic travel control of the vehicle. For example, the travel control unit 26 recognizes the travel path and the obstacles based on the detection information from the object detector 4 and outputs the control signal to the engine control unit 11, the brake control unit 12, and the steering control unit 13, and then, causes the vehicle to automatically travel along the travel path while avoiding the obstacles. This automatic travel control may be performed as the driving assist control or may be performed as the automatic driving control. In addition, after the automatic travel end notification is performed by the HMI system 14 during the automatic travel control, and in a case where it is determined by the driving operation state determination unit 25 that the driver is not in the manual driving acceptance state, the travel control unit 26 performs the travel control such that the travel state of the vehicle is changed. For example, the travel control unit 26 performs a deceleration control or a vehicle stop control.

The above-described vehicle position recognition unit 20, the driver state detection unit 21, the driving adaptation degree calculation unit 22, the notification timing setting unit 23, the notification control unit 24, the driving operation state determination unit 25, and the travel control unit 26 may be configured by introducing software or a program that realizes each of the functions of the vehicle control ECU 2. In addition, part or all of these units may be individual electronic control units.

Next, the operation and a vehicle control method in the vehicle control device 1 in the present embodiment will be described.

Figure 4:
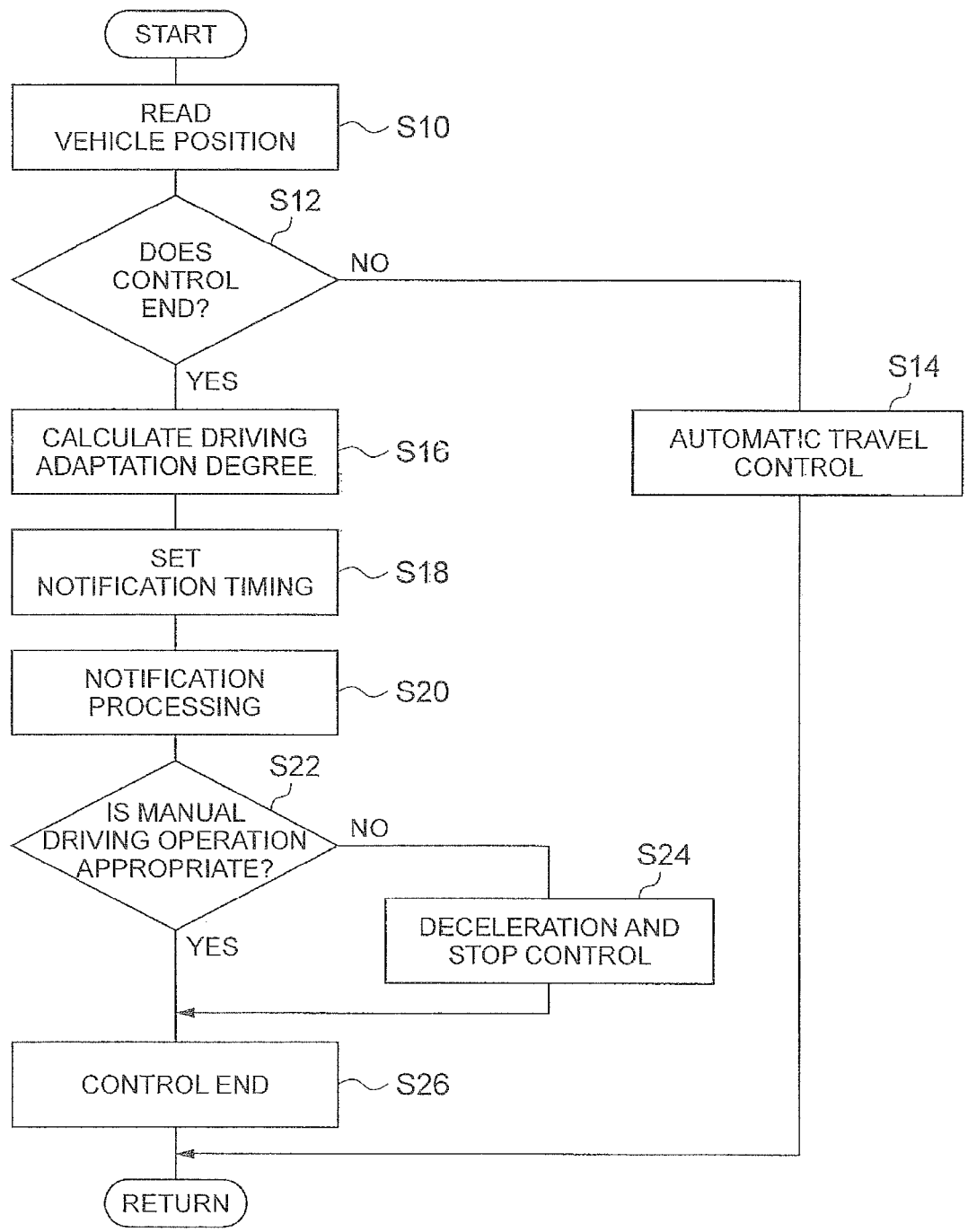
FIG. 4 is a flow chart illustrating automatic travel control processing in the vehicle control device in FIG. 1.

FIG. 4 is a flow chart illustrating the processing in the vehicle control device 1 in the present embodiment. The vehicle travel control processing is performed while the automatic travel control is executed, and includes the control processing of the automatic travel of the vehicle and the processing at the time when the automatic travel control ends. The vehicle travel control processing is performed, for example, by the vehicle control ECU 2 and repeatedly executed at a predetermined period.

As illustrated in STEP S10 (hereinafter, referred to as simply "S10", the same is applied to other STEPs S.) in FIG. 4, firstly, vehicle position recognition processing is performed. The vehicle position recognition processing is processing of recognizing the position of the vehicle on the map, and is executed by for example, the vehicle position recognition unit 20. For example, the vehicle position with respect to the map data is recognized based on the vehicle position data input from the navigation system 3.

Then, the process proceeds to S12, and it is determined whether or not the travelling position of the vehicle is within the predetermined distance from the ending point of the automatic travel. This determination processing is the processing for determining whether or not the preparation of switching from the automatic travel to the manual travel is needed due to the ending of the driving assist or the automatic driving, and is performed by, for example, the vehicle position recognition unit 20.

In a case where it is determined that the travelling position of the vehicle is not within the predetermined distance from the automatic travel control ending point in S12, the automatic travel control is continuously performed (S14). That is, appropriate signals are output to the engine control unit 11, the brake control unit 12, and the steering control unit 13 from the travel control unit 26 while considering the detection information by the object detector 4. In this way, the vehicle automatically travels along the travel path while avoiding the obstacles.

On the other hand, in a case where it is determined that the travelling position of the vehicle is within the predetermined distance from the automatic travel control ending point in S12, the processing of calculating the manual driving adaptation degree is performed (S16). The calculation processing is the processing of calculating the manual driving adaptation degree of the driver during the automatic travel of the vehicle, and is performed by the driving adaptation degree calculation unit 22. For example, the manual driving adaptation degree of the driver is calculated based on the driver state detected by the driver state detection unit 21. In a case where the wakefulness degree of the driver or the driving concentration degree of the driver can be detected as the driver state by the driver state detection unit 21, the wakefulness degree of the driver or the driving concentration degree may be used as the manual driving adaptation degree. As described above, the manual driving adaptation degree is the degree of adaptation of the driver to the manual driving operation, and the value thereof becomes high in the adapted state to the manual driving.

Then, the process proceeds to S18 and the notification timing setting processing is performed. The notification timing setting processing is the processing of setting the timing for performing the automatic travel end notification to the driver before the vehicle arrives at the ending point of the automatic travel. The timing for performing the automatic travel end notification is set according to the manual driving adaptation degree, and for example, the notification timing is set such that the timing becomes earlier as the manual driving adaptation degree becomes lower. Specifically, as illustrated in FIG. 2, the required transfer time is calculated based on the manual driving adaptation degree using the calculation map in which the manual driving adaptation degree and the required transfer time are associated with each other. The required transfer time is the time required for the automatic travel transferring to the manual travel, and is time from the time when the automatic travel end notification is performed to the time when the driver is in the manual driving adaptation state. Then, as illustrated in FIG. 3, the transfer finishing time is calculated based on the distance to the automatic travel ending point and the vehicle speed, the time or the time point which becomes the notification timing is set by subtracting the required transfer time from the transfer finishing time, and then, the calculated notification timing is set as the timing for performing the automatic travel end notification.

In calculating the required transfer time in the notification timing setting processing, the calculation map that is set based on the past data of the manual driving adaptation degree and the required transfer time in the manual driving adaptation degree may be used. For example, actual data of the manual driving adaptation degree of the driver and the required transfer time in the manual driving adaptation degree are stored, the actual data is reflected on the calculation map to be updated or learned, the required transfer time is calculated using the calculation map, and then, the notification timing may be set. In this case, the required transfer time can be accurately calculated according to the manual driving adaptation characteristics of the driver and thus, it is possible to appropriately set the notification timing.

In addition, at the time of setting the notification timing, it may be determined whether or not the notification timing is appropriate, and in a case where the notification timing is not appropriate, the notification timing may be set again after the vehicle speed adjustment is performed. For example, in the current travelling state of the vehicle, the time it takes for the vehicle to arrive at the automatic travel ending point is calculated, the required transfer time is calculated, and in a case where the time it takes for the vehicle to arrive at the automatic travel ending point is equal to or longer than the required transfer time, the notification timing is determined to be appropriate. On the other hand, in a case where the time it takes for the vehicle to arrive at the automatic travel ending point is not equal to or longer than the required transfer time, the notification timing is determined not to be appropriate. In this case, there is a problem in that the driver may not be in the manual driving acceptance state until the vehicle arrives at the ending point of the automatic travel.

In this case, the notification timing is determined not to be appropriate, the deceleration processing of the vehicle is performed. This deceleration processing is processing of performing the travel control of decelerating the vehicle and is performed by, for example, the travel control unit 26. By decelerating the vehicle, the time it takes for the vehicle to arrive at the automatic travel ending point becomes long, and thus, it is possible to make the time it takes for the vehicle to arrive at the automatic travel ending point become equal to or longer than the required transfer time. Then, when this deceleration processing ends, the time it takes for the vehicle to arrive at the automatic travel ending point in the decelerated travel state is calculated, the required transfer time is calculated, and whether or not the time it takes for the vehicle to arrive at the automatic travel ending point is equal to or longer than the required transfer time is checked, and then, it is determined whether or not the notification timing is appropriate. Here, in a case where the time it takes for the vehicle to arrive at the automatic travel ending point is equal to or longer than the required transfer time, the notification timing is determined to be appropriate and the notification timing is set as the notification timing used in the actual notification. These appropriateness determination and deceleration processing tasks may be repeatedly performed multiple times. In addition, these appropriateness determination and deceleration processing tasks may be performed before setting the notification timing.

When the notification timing setting processing in S18 ends, the notification processing is performed (S20). The notification processing is processing of performing the notification of ending of the automatic travel to the driver at the set notification timing, and is performed by, for example, the notification control unit 24. The notification control signal is output to the HMI system 14 from the notification control unit 24 and the HMI system 14 performs the notification operation. The notification operation is performed by, for example, outputting the voice. Specifically, the voice such as "Soon, the travel control will end", "A few minutes later, the travel control will end", or "Please prepare the manual driving" is output. The voice content of the notification may be other than the above-described content as long as it can be understood that the automatic travel control ends or the preparation of the manual driving is needed.

In addition, the notification operation may be performed by displaying on a monitor, or by a display lighting or a display blinking that means ending of the travel control, the ending of the driving assist, or the preparation of the driving. In addition, the notification may be given to the driver by vibrating the steering wheel or the seats. This notification processing is performed at the earlier timing as the manual driving adaptation degree of the driver becomes lower. In this way, the time it takes for the vehicle to arrive at the automatic travel ending point from the automatic travel end notification can be made long as manual driving adaptation degree is lower, and thus, it is possible to suppress the performing of inappropriate switching from the automatic travel to the manual travel.

Then, the process proceeds to S22, and it is determined whether or not the manual driving operation state of the driver is appropriate. This determination is the processing of determining whether or not the driver is in the manual driving acceptance state at a predetermined time after notifying the ending of the automatic travel. The time set in the vehicle control ECU 2 in advance is used as the predetermined time. The manual driving acceptance state is a state in which the driver can adapt to the manual driving. For example, in this determination processing, the determination of whether or not the driver is in the manual driving acceptance state is performed based on the driving operation state detected by the driving operation detector 6. Specifically, in a case where the driver's contact to the steering wheel is detected by the driving operation detector 6, in a case where the accelerator pedal is detected to be pressed, or in a case where the brake pedal is detected to be pressed, it is determined that the driver is in the manual driving acceptance state, and thus, the manual driving operation of the driver is determined to be appropriate. On the other hand, in a case where a driver's contact to a steering wheel is not detected by the driving operation detector 6, in a case where the accelerator pedal is not detected to be pressed, or in a case where the brake pedal is not detected to be pressed, it is determined that the driver is not in the manual driving acceptance state, and the manual driving operation of the driver is determined not to be appropriate.

In a case where it is determined that the driver is not in the manual driving acceptance state, and the manual driving operation of the driver is determined not to be appropriate in S22, deceleration and stop control processing is performed (S24). The deceleration and stop control processing is processing for causing the vehicle to decelerate or stop, and is performed by, for example, the travel control unit 26. Specifically, an added time to the required transfer time is calculated, an amount of speed adjustment used for making the added time is calculated, and then, the vehicle is decelerated according to the amount of speed adjustment. In this way, since the time it takes for the vehicle to arrive at the automatic travel ending point is extended, the possibility that the driver is in the manual driving acceptance state increases, and it is possible to suppress the performing of inappropriate switching from the automatic travel to the manual travel.

In addition, even when the vehicle is decelerated, in a case where it is determined that the driver cannot be in the manual driving acceptance state until the vehicle arrives at the ending point of the automatic travel, the travelling of the vehicle is stopped. In this way, it is possible to suppress the performing of switching to the manual travel in an inappropriate state of the driver. When the deceleration and stop control processing in S24 ends, a series of control processing ends. In a case where the deceleration processing is performed in the deceleration and stop control processing in S24, the process returns to S22 and it may be determined again whether or not the driver is in the manual driving acceptance state, or returns to S20 and the notification processing may be performed again.

Incidentally, in a case where the driver is in the manual driving acceptance state and the manual driving operation of the driver is determined to be appropriate in S22, it is determined that the switching from the automatic travel to the manual travel is appropriately performed, and the control ending processing is performed (S26). The control ending processing is the processing of ending the automatic travel control. When the processing in S26 ends, a series of processing tasks ends.

In the vehicle travel control processing in FIG. 4, in some cases, the determination processing of the manual driving operation state in S22 and the deceleration and stop control processing in S24 are omitted. Even in this case, the notification of switching from the automatic travel of the vehicle to the manual travel by the driver can be appropriately performed by performing the automatic travel end notification at the earlier timing as the manual driving adaptation degree of the driver becomes lower.

As described above, according to the vehicle control device 1 in the present embodiment, when the automatic travel of the vehicle ends, by performing the automatic travel end notification at the earlier timing as the manual driving adaptation degree of the driver becomes lower, the time it takes for the vehicle to arrive at the automatic travel ending point from the automatic travel end notification can be made long as manual driving adaptation degree is lower. In this way, the notification of switching from the automatic travel of the vehicle to the manual travel by the driver can be appropriately performed, and thus, it is possible to suppress the inappropriate switching from the automatic travel of the vehicle to the manual travel by the driver.

For example, if the automatic travel end notification is uniformly performed at the same time regardless of the manual driving adaptation degree, in a case of the state in which the manual driving adaptation degree is low, there is a problem in that the driver cannot be in the manual driving acceptance state until the vehicle arrives at the ending point of the automatic travel. Conversely, in the vehicle control device 1 in the present embodiment, by performing the automatic travel end notification at the earlier timing as the manual driving adaptation degree becomes lower, it is possible to take a long time to make the state in which the manual driving can be performed in a case where the manual driving acceptance state is low, and thus, it is possible to suppress the inappropriate switching from the automatic travel of the vehicle to the manual travel by the driver.

In addition, in the vehicle control device 1 according to the present embodiment, by changing the travel state of the vehicle in a case where the driver is not in the manual driving acceptance state after performing the automatic travel end notification, it is possible to suppress the switching to the manual travel by the driver in the inappropriate state. In addition, in the vehicle control device 1 in the present embodiment, by decreasing the vehicle speed in a case where the driver is not in the manual driving acceptance state after performing the automatic travel end notification, the time it takes for the vehicle to arrive at the automatic travel ending point can be extended, and thus, it is possible to make it easy to switch to the manual travel by the driver. In addition, in the vehicle control device 1 in the present embodiment, by stopping the vehicle in a case where the driver is not in the manual driving acceptance state after performing the automatic travel end notification, it is possible to suppress the switching to the manual travel by the driver in an inappropriate state.

In addition, in the vehicle control device 1 according to the present embodiment, by notifying the ending of the automatic travel at timing corresponding to the wakefulness degree of the driver, it is possible to notify of the ending of the automatic travel at the timing conforming to the wakefulness state of the driver, and thus, the notification of switching from the automatic travel of the vehicle to the manual travel by the driver can be appropriately performed.

Furthermore, in the vehicle control device 1 according to the present embodiment, by setting the timing for the automatic travel end notification based on the storage data in which the manual driving adaptation degree of the driver and the time it takes to the time when the driver is in the manual driving adaptation state are associated with each other, the notification of switching from the automatic travel of the vehicle to the to the manual travel by the driver can be appropriately performed according to the characteristics of the driver.

In the embodiment described above, one embodiment of the vehicle control device in the present invention is described, but the vehicle control device in the present invention is not limited to the device described in the above-described embodiment. The vehicle control device in the present invention may be a device which is modified from the vehicle control device in the above-described embodiment or may be a device which is adopted to the other device in such a manner that the gist described in the Claims is not changed.

What is claimed is:

1. A vehicle control device that is configured to be capable of switching from an automatic travel of the vehicle to manual travel by a driver, comprising:
a driver state detection unit that is configured to detect a driver state of the driver of the vehicle based on information detected by at least one of a sensor and a camera relating to at least one of a wakefulness state and a concentration state of the driver;
a calculation unit that is configured to calculate a manual driving adaptation degree of the driver during the automatic travel of the vehicle based on the driver state detected by the driver state detection unit; and
a notification unit that is configured to perform an automatic travel end notification to the driver before the vehicle arrives at an automatic travel ending point set in advance, the notification being performed via at least one of a display and a speaker provided in the vehicle,
wherein the notification unit performs the automatic travel end notification at an earlier timing as the manual driving adaptation degree becomes lower.

2. The vehicle control device according to claim 1, further comprising:
a driving operation detector that is configured to detect a driving operation state of the driver;
a driving operation state determination unit that is configured to determine whether or not the driver is in a manual driving acceptance state based on the driving operation state detected by the driving operation detector after the automatic travel end notification is performed by the notification unit; and
a vehicle travel control unit that is configured to change the travel state of the vehicle in a case where it is determined by the driving operation state determination unit that the driver is not in the manual driving acceptance state.

3. The vehicle control device according to claim 2, wherein, in a case where it is determined that the driver is not in the manual driving acceptance state by the driving operation state determination unit, the vehicle travel control unit decreases the vehicle speed.

4. The vehicle control device according to claim 2, wherein, in a case where it is determined that the driver is not in the manual driving acceptance state by the driving operation state determination unit, the vehicle travel control unit stops the vehicle.

5. The vehicle control device according to claim 1, wherein the calculation unit calculates a wakefulness degree of the driver as the manual driving adaptation degree, and
wherein the notification unit performs the automatic travel end notification at the earlier timing as the wakefulness degree of the driver becomes lower.

6. The vehicle control device according to claim 1, further comprising:
a storage unit that is configured to store data in which the manual driving adaptation degree at the time when the automatic travel end notification is performed and a time it takes from the automatic travel end notification to the time when the driver is in the manual driving adaptation state in the above manual driving adaptation degree are associated with each other,
wherein the notification unit performs the automatic travel end notification at the timing set based on the manual driving adaptation degree calculated by the calculation unit and the data stored in the storage unit.

* * * * *